Aug. 28, 1962 C. R. KUZELL ET AL 3,051,467
APPARATUS FOR PRODUCING SPONGE IRON
Filed March 8, 1960 4 Sheets-Sheet 4

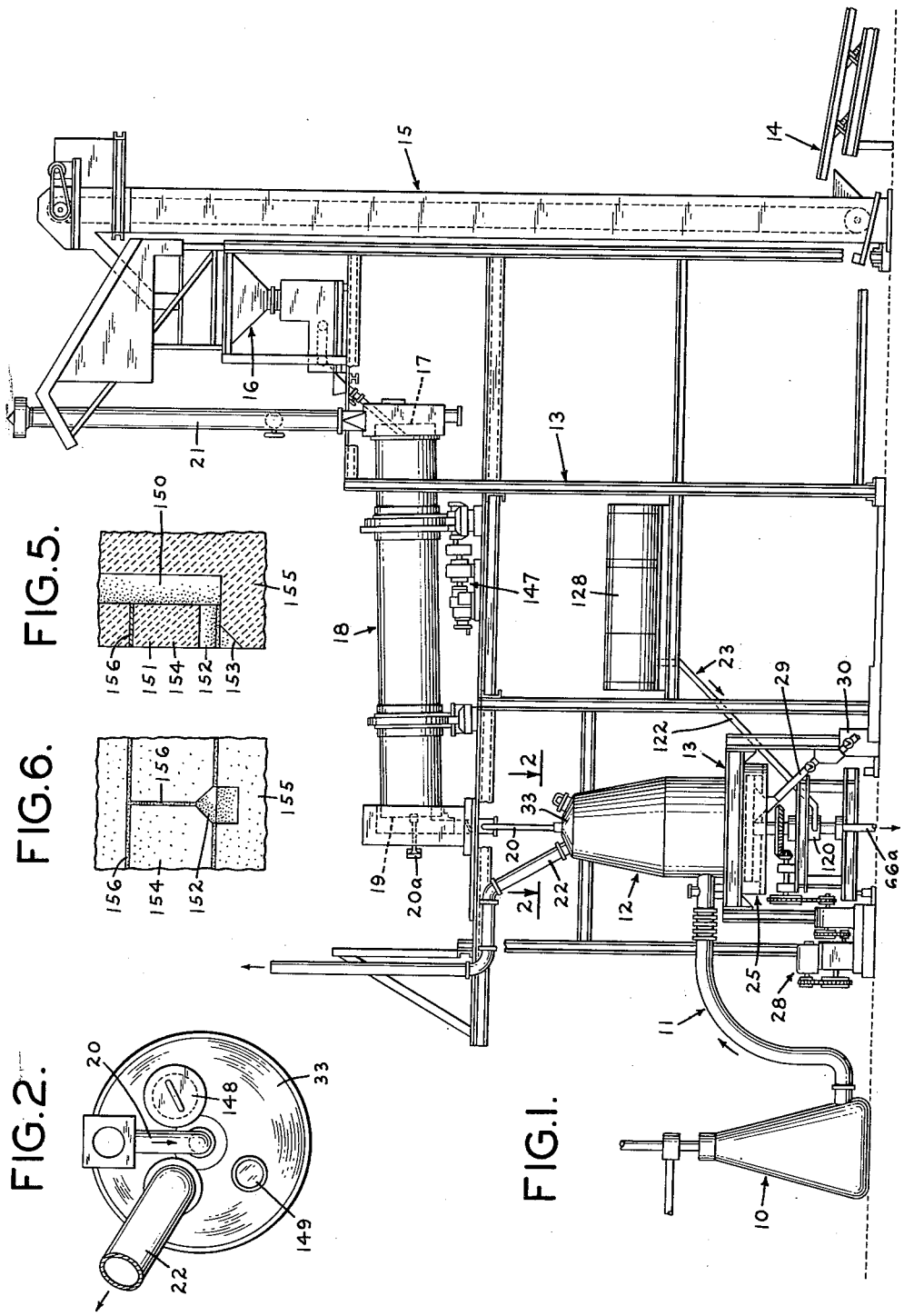

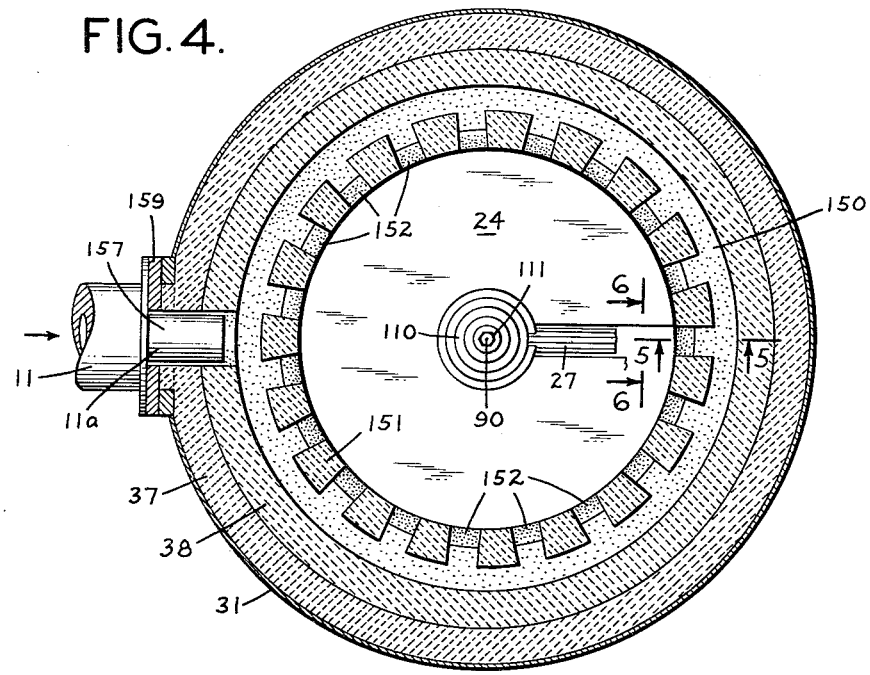
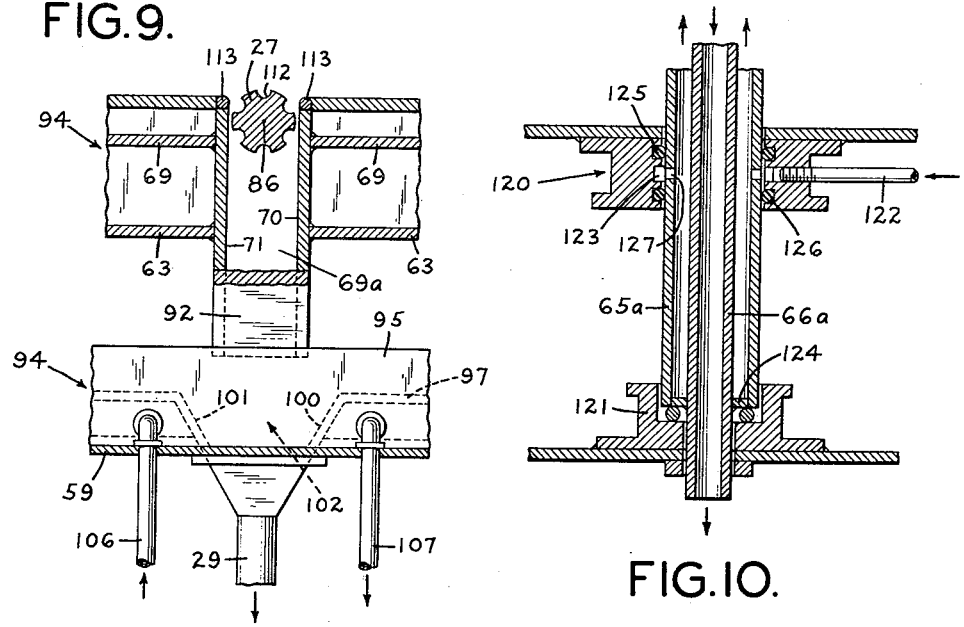

United States Patent Office 3,051,467
Patented Aug. 28, 1962

3,051,467
APPARATUS FOR PRODUCING SPONGE IRON
Charles R. Kuzell, Phoenix, Morris G. Fowler and John H. Davis, Jr., Douglas, Leonard Klein, Scottsdale, and Irvine Macdougall, Warren, Ariz., assignors to Phelps Dodge Corporation, New York, N.Y., a corporation of New York
Filed Mar. 8, 1960, Ser. No. 13,592
9 Claims. (Cl. 266—24)

This invention relates generally to the reduction of iron oxide to produce sponge iron and to apparatus and method for carrying out the reducing reaction. The invention relates more specifically to a method and apparatus for producing sponge iron from iron-containing copper ores and particularly from copper matte that has been treated in a special way to produce an iron source material for the production of sponge iron. Although the apparatus is admirably suited to the production of sponge iron from such an iron source material produced from copper matte, it also may be used to produce sponge iron from other iron oxide source material produced in other ways.

There is now available a process for smelting copper and iron sulfides in which the matte, produced in a matte-producing furnace (such as a reverberatory) is blown in a conventional copper converter without the addition of a siliceous flux. This process produces a magma in which iron oxides predominate. This magma which has been called Ferramag is amenable to comminution and subsequent treatment in a reducing furnace with a reducing gas to produce sponge iron. In former conventional copper converter practice to produce blister copper, or the like, a siliceous flux was added to the matte in the converter and iron which was in the matte collected in the form of an iron silicate slag which was recycled to the matte-producing furnace and then ultimately transported to a waste dump. Substantially all of the iron in this slag is in the form of an iron silicate. For one reason or another this source of iron has not been used for the production of sponge iron.

According to the newer method mentioned above of operating the copper converter, which method is described in further detail in the application of Charles R. Kuzell et al., for U.S. Patent Serial No. 13,593, filed March 8, 1960, copper matte is blown in the copper converter without addition of a siliceous flux from an external source and the converter is operated preferably at a temperature in the neighborhood of 2400° F. The iron in the matte collects in a magma in the form of FeO and $Fe_3O_4$ and possibly other oxide of iron, with only a small amount in the form of silicate. This magma is designated by the name Ferramag. The molten Ferramag lends itself to comminution to desirable particle size by an hydraulic quenching and granulation process described and claimed in application of Charles R. Kuzell et al. for U.S. Patent Serial No. 13,589, filed March 8, 1960, now Patent No. 3,023,454. Although we prefer to produce the granulated Ferramag by the hydraulic quenching and granulation process described in that application for patent, our iron oxide reducing apparatus is suitable for the reduction to sponge iron of comminuted iron oxide produced in other ways or from other sources.

In accordance with our invention, comminuted iron oxide source material making up the charge is dried, preheated and oxidized in a suitable furnace which may, for example, be an elongated rotary furnace through which the comminuted charge is passed. The charge, preferably preheated and oxidized, is then passed into the upper end of a vertically disposed circular reducing chamber and passes downwardly therethrough. Reducing gas, preferably air-reformed natural gas within controlled temperature limits and within a predetermined essential range composition, is passed upwardly through the downwardly passing charge and thence out of the top end of the reducing chamber. The spent gas from the reducing chamber which still retains sensible and potential heat values may be used to preheat the incoming charge or for such other purposes as desired. The reduced sponge iron product is removed from the bottom end of the reducing furnace simultaneously as new charge is introduced at its top end. A novel bottom closure for the reducing chamber, in the form of a circular table rotatable on a vertical axis, is provided at the bottom end of the reducing chamber and this rotatable table is provided with a radially disposed slot in which a grooved delivery cylinder is mounted for rotation on a horizontal axis; the grooves lying coaxially at the periphery of the delivery cylinder and extending the full radius of the reducing chamber. The delivery cylinder collects small amounts of charge in its grooves from the bottom of the column of charge in the reducing furnace as the periphery of the delivery cylinder rotates on its horizontal axis, simultaneously with the rotation of the table bottom on its vertical axis. That is, the finished sponge iron product is "nibbled" off the bottom of the pile of charge in the reduction chamber by the edges of the grooves in the rotating delivery cylinder cutting into the treated charge at the bottom of the pile causing the product to collect in these grooves in small amounts. These "grooves-full" of sponge iron product are delivered by the cylinder, as it rotates, to a sponge iron receiving trough where it may be cooled and then delivered into a chute through which it is passed into a suitable collector container.

Although the novel features which are believed to be characteristic of the invention are pointed out in the annexed claims, the invention itself as to its objects and advantages and the manner in which it may be carried out, may be better understood by reference to the following more detailed description, taken in connection with the accompanying drawings forming a part hereof, in which FIG. 1 is a view in elevation, partly diagrammatic, of a plant for producing sponge iron from comminuted iron-oxide source material such as Ferramag, illustrating an embodiment of our invention;

FIG. 2 is a top plan view of the reducing furnace on line 2—2 of FIG. 1;

FIG. 4 is a sectional view on line 4—4 of FIG. 3 but to larger scale showing the reducing gas manifold for distributing reducing gas into a charge of iron oxide in the reducing chamber;

FIG. 5 is a view on line 5—5 of FIG. 4 showing a detail;

FIG. 6 is a view on line 6—6 of FIG. 4; this is a view at right angles to FIG. 5;

FIG. 9 is a view on line 9—9 of FIG. 8, showing the rotatable delivery cylinder and delivery chute; and FIG. 10 is a partial view in section on line 10—10 of FIG. 3.

Figure 3:
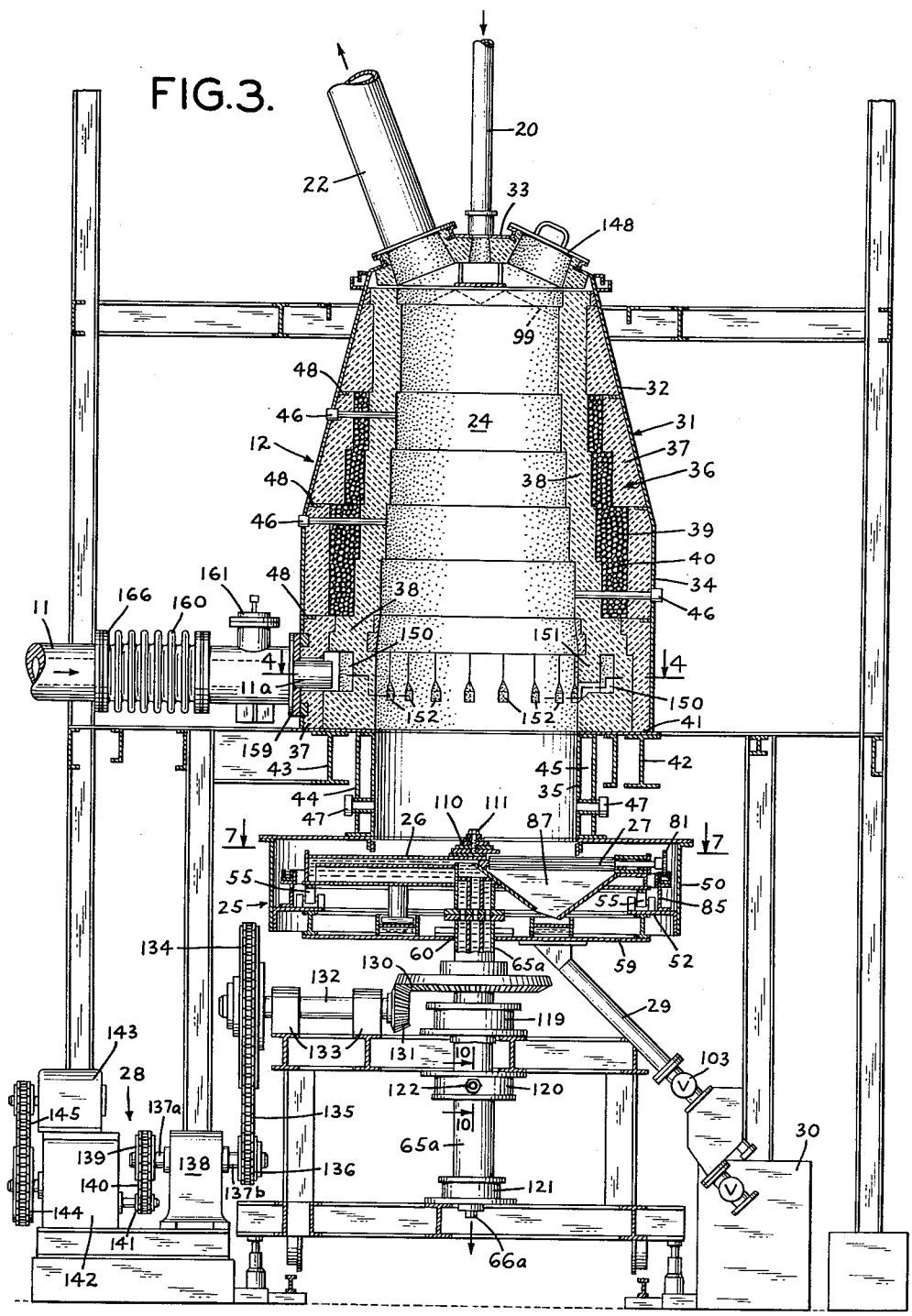
FIG. 3 is a view to larger scale, in elevation and partly in section, of the reducing furnace, showing the rotatable table bottom, rotating mechanism, delivery chute, and related parts.

Referring now to the drawings in which like reference characters indicate like parts throughout the several views, an illustrative plant according to our invention for producing sponge iron from comminuted or granular iron oxide is shown generally in FIG. 1. It comprises, in general, a gas reformer 10 in which natural gas may be reformed for use as a gaseous reducing agent. The reformed gas is delivered through a suitable conduit 11 through throat 11a into an annular distributor manifold in the lower end of a reducing furnace 12. The entire structure is carried on a suitable framework of structural steel 13.

Iron oxide charge material in granular form is delivered by conveyor 14 to bucket elevator 15 which transports the material to an elevated storage bin 16. The material is delivered to the charge end 17 of an inclined rotating refractory lined furnace 18 all suitably supported for rotation on the steel framework 13. Material charged into the rotary furnace is passed through it and delivered from its discharge end 19, through a charge conduit 20 into the upper end of the reducing furnace 12. The rotary furnace 18 may be heated by a combustible gas introduced through a burner 20a. The hot gases dry, preheat and oxidize the charge continuously passing through the rotary furnace. The combustion gases may be vented to atmosphere through a vent stack 21.

The granular iron oxide charge introduced into the reducing furnace 12 provides a column of granular charge which rests upon the bottom of the furnace chamber, and as the charge passes downwardly through the reducing chamber 24, it is brought into intimate contact with the upwardly flowing reducing gases introduced through the distributor manifold. The reducing gas which we have found to be particularly satisfactory is reformed sulfur-free natural gas. This brings about a reducing reaction converting iron oxide to sponge iron. The spent residual gases passing out of the columnar bed of charge in the furnace may be carried through a residual gas discharge conduit 22 from the top of the furnace to such place and for such use as may be desired because it contains usable sensible heat and also calorific values and therefore may be burned and used for such heating purposes as desired, such as for heating in waste heat boilers. Or, if desired, this residual spent gas rising from the bed of charge in the furnace may be led directly into the discharge end 19 of the rotary furnace 18 for drying and preheating the charge passing through this furnace.

The bottom closure of the furnace (designated generally by reference numeral 25) comprises a bottom in the form of a rotatable water-cooled table 26 (see FIG. 3) in which is mounted a grooved delivery cylinder 27 and mechanism 28 to rotate the table and delivery cylinder all as described in further detail hereinafter. A water supply system 23 is provided for cooling the rotating table and other parts.

As charge is continuously introduced into the top of the reducing furnace 12, a corresponding amount of finished iron oxide product is taken from the bottom of the column of charge resting on the rotating table 26 by the rotating grooved delivery cylinder 27 (see FIG. 3). The finished product is delivered to a receiving water-cooled trough and thence to a discharge chute 29 into a collecting container 30.

The reducing furnace itself is perhaps best shown in FIG. 3. It comprises a steel shell 31 of generally cylindrical shape, the upper end portion 32 being upwardly and inwardly tapered, a steel roof 33, an intermediate cylindrical portion 34, and a lower cylindrical portion 35. The intermediate portion 34 and upper portion 32 of the shell is lined with suitable insulating and refractory material 36 comprising an outside layer of insulating brick 37 and an inner layer of refractory lining brick 38. It should be noted that the annular space 39 between the outer layer of brick 37 and the lining brick 38 is filled with an unbonded, sized aggregate 40 of refractory material such as a mixture of silica pebbles, sand, and dust. The aggregate is for making the furnace wall substantially gas-tight. It is sized so as to give it maximum specific gravity. This is accomplished by filling the interstices between relatively large particles with size particles considerably smaller. In turn, the interstices between the small particles are filled with yet smaller size, and again the interstices between these small particles are filled with a very fine powder of the same refractory material. A mix which we have found to be satisfactory may consist of 59.5 parts (by weight) of minus two inches plus one inch silica (quartz) pebbles, 22 parts of minus 6 mesh plus 30 mesh silica sand, and 13.2 parts by weight of minus 50 plus 140 mesh silica sand, and 5.3 parts of minus 200 mesh silica dust.

The refractory liner 36 rests upon an annular flat steel ring 41 which in turn, rests upon horizontally disposed structural frame members 42, 43. The lower cylindrical portion 35 of the reducing furnace is surrounded by a jacket 44, thus providing an annular cooling space 45 through which a cooling fluid may be circulated, if desired. At spaced vertical intervals within the shell 31 are flat annular steel plate rings 48 which impede passage of gas between outer shell 31 and the layer of insulating brick 37. Extending outwardly from the lower end of the jacketed portion 35 of the furnace is a flat annular plate member 49, having depending therefrom an apron portion 50. It will be observed that the reducing chamber 24 is increased in diameter at intervals downwardly from the top. Wells 46 for pyrometer couples and cleanout ports or poke holes 47 are provided.

Mounted on the inner surface of the rectangular apron 50 at its lower end is an angle iron 51 providing a circular shelf 52 upon which are mounted a plurality of rollers 55 circumferentially spaced 60°, or other suitable distance, apart; the shaft of each of these rollers being mounted for rotation in a pair of bearings mounted in bearing blocks 56 (see FIG. 8) which in turn are fixedly mounted on and supported by the circular shelf 52 in such a manner that the rollers and shaft are along the radius of the rotating table 26. These rollers support the weight of water-cooled rotatable table 26. Mounted on the underside of the table structure is a peripheral circular track 57, which engages the rollers 55 permitting the circular track to roll in a circular path on the rollers 55. The shelf 52 is also supported on I-beams 58 to which is secured a horizontally disposed bed plate 59 having a central opening 60 to accommodate concentric hollow shafts which rotate as described later on. It will be seen that the ring 49, apron 50, shelf 52, I-beam 58 and plate 59 provide, in effect, a gas-tight chamber in which the table 26 is mounted for rotation.

The rotatable water-cooled table 26 (see FIG. 8) comprises a circular table top 61, a cylindrical side wall 62 and a bottom wall 63 thus to provide a chamber 64 through which water or other suitable cooling fluid may be circulated to cool the table and other parts. Bottom wall 63 has at its center a depending outer hollow shaft 65 which at its upper end terminates short of the table top 61. Extending outwardly from the upper end of the outer hollow shaft 65 is a circularly shaped baffle plate 69. Mounted concentrically within the outer vertical hollow shaft 65 is an inner hollow shaft 66 which at its upper end terminates in an annular ring closure plate 67 closing the hollow shaft 65 except for the hollow end of the inner vertical shaft 66. Circumferentially spaced holes 68 in the wall of outer shaft 65 provide passageway for cooling fluid from the annular space between inner and outer hollow shafts 65, 66 into the chamber 64. The baffle 69 provides a path of flow for the cooling fluid in contact with the underside of table top 61, and then back to the inner hollow shaft 66.

Figure 7:
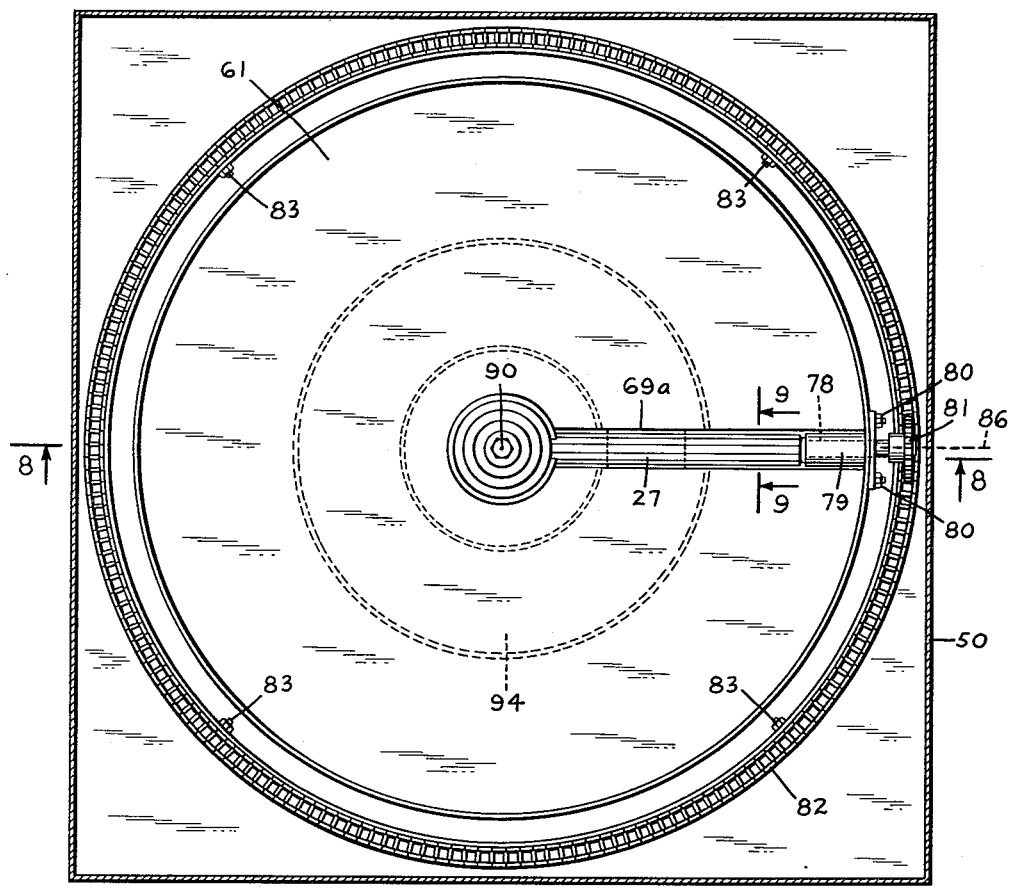
FIG. 7 is a view on line 7—7 of FIG. 3, but to larger scale, showing the top of the rotatable table forming the bottom closure of the reducing furnace, and the grooved delivery cylinder mounted for rotation therein.

The rotatable bottom closure or table 26 has a radially disposed slot 69a (see FIGS. 7 and 9), bounded on its radial vertical sides by plates 70, 71 to accommodate the radially disposed delivery cylinder 27 for rotation therein on its long axis 86. To provide bearing at the inner end of shaft 27 a bearing block 75 which has a stub shaft 76, is secured to the table top 61 (see FIG. 8). The inner end of the delivery cylinder 27 is hollowed out to provide a cup 77 or hub fitting over the radially extending stub shaft 76 for rotation thereon. The outer end of the delivery cylinder is provided with a stub shaft 78 rotatably mounted in a bearing 79 at the end of the slot 69a; this bearing being secured in place by removable bolts 80 (see FIG. 7). The outer end of shaft 78 has fixed or keyed thereto a sprocket wheel 81.

The delivery cylinder sprocket wheel 81 engages a sprocket chain 82 arranged in a circular path by clamping it, by means of a plurality of circumferentially spaced clamps 83 (see FIGS. 7, 8) to the upper flange 84 of a circularly shaped channel member 85, the lower flange of which rests upon the shelf 52. Now it will be seen that when the table 26 is rotated on its vertical axis 90, the sprocket 81 will rotate, because of its engagement with the sprocket chain 82, and this rotates the delivery cylinder on its axis 86. In other words, the sprocket travels in a circular orbit on sprocket chain track 82 about the axis 90 while simultaneously the sprocket is rotating on its axis 86. The sprocket 81, as shown, rotates on its axis about sixteen times for each revolution of the sprocket in its orbit on chain track 82 about the axis 90.

Figure 8:
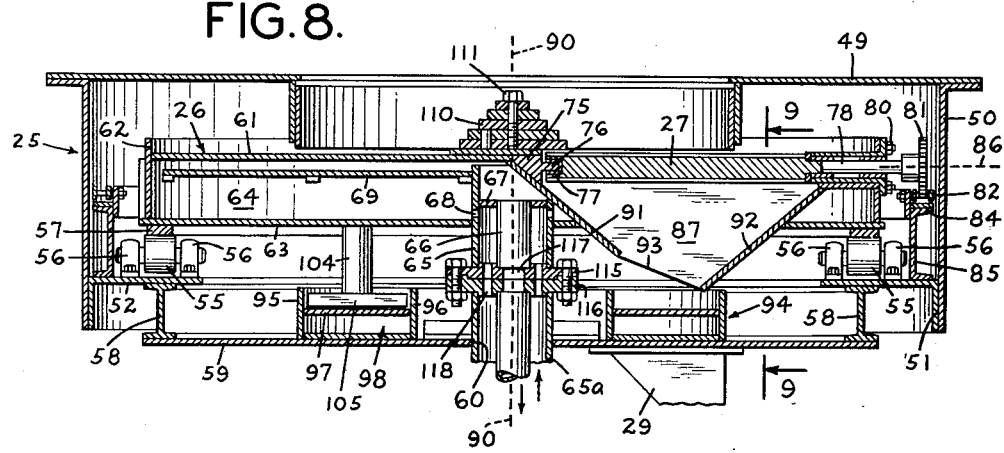
FIG. 8 is a view on line 8—8 of FIG. 7.

The side walls 70 and 71 forming the slot are connected at their inner ends by wall 91 inclined downwardly and outwardly from the inner end of the slot and at their outer ends by a wall 92 inclined downwardly and inwardly, thus forming a chute 87 having a delivery opening 93 (see FIGS. 8, 9).

The delivery end of discharge opening 93 is positioned over a circular product-receiving channel 94 having side walls 95, 96 and bottom wall 97; there being provided also a water jacket 98 beneath the circular bottom wall 97 for the passage therethrough of cooling fluid, to maintain the channel cool and also to cool finished product delivered from the chute 87. The channel rests upon the closure bed plate 59.

The channel bottom plate 97 is interrupted beneath chute opening 93 by walls 100, 101 (see FIG. 9) and they provide an opening 102 from channel 94 into a stationary delivery chute 29 which delivers finished product to a water-cooled receiver 30 (see FIG. 3); chute 29 being provided with a closeable and openable valve 103.

Extending downwardly from the bottom wall 63 of the table is an arm 104 upon which is mounted a hoe member 105. More than one hoe may be located within the circular channel 94 and hence material delivered into the channel through opening 93 is moved by the hoes in the channel to deliver the material into the stationary delivery chute 29. An inlet 106 and outlet 107 is provided for circulation of cooling fluid in the circular jacket 98. Hence, it will be seen that finished sponge iron product may be "nibbled" evenly off the bottom of a pile of treated charge on the table top 61 by means of rotating delivery cylinder 27, then collected and cooled in channel 94, thence delivered into chute 29 and finally into receiver 30, without exposure to outside oxidizing air or atmosphere.

At the center of the rotatable table top 61 is a plurality of superimposed flat disc rings 110 decreasing in diameter from bottom to top and held in place by a cap screw 111 to form a central guide cone. This not only protects the inner bearing 76 of the delivery cylinder from the granular product but also directs the movement of the product resting on the table in the chamber 24 outwardly to be picked up in the delivery grooves 112 (see FIG. 9) of the delivery cylinder 27. It may be noted that abrasion resistant bars 113 of circular cross section are mounted along the upper edges of the slot to protect the corners of the slot.

The downwardly extending hollow outer shaft 65 and the inner hollow shaft 66 extending downwardly from the center of table 26 are connected to corresponding outer shaft 65a and 66a by means of flanges 115, 116 having central openings 117 connecting the inner shafts and a series of openings 118 connecting the outer hollow shafts. The hollow shaft 65a extends downwardly through radial bearing 119 and water chest 120 (see FIG. 3) secured to the framework and terminating in thrust bearing 121. It will be seen that the main weight of the rotating table 26 is carried by the rollers 55 which are carried by the shelf 52 and the thrust bearing 121. The water chest 120 is in the form of a manifold (see FIGS. 1, 3) for introducing cooling water through inlet pipe 122 from tank 128 into an annular groove 123 (see FIG. 10). Opposite this groove is a series of inlet holes 127 in the wall of hollow shaft 65a which is closed by a ring plate 124 at its lower end. Resilient O-rings 125, 126 provide water seals. The concentric inner hollow shaft 66a extends downwardly and out of bearing 121 and discharges cooling water that has circulated upwardly through the outer shaft 65, thence through the table cooling chamber 64 and finally into the hollow shaft 66.

A bevel gear 130 is fixed to shaft 65a (see FIG. 3). This gear meshes with a bevel pinion gear 131 keyed to a horizontally disposed shaft 132 rotatable in bearings 133 mounted on the framework. The other end of the shaft 132 has a sprocket 134 keyed thereto, over which is trained an endless sprocket chain 135, in turn trained over a sprocket gear 136. The sprocket 136 is secured to low speed shaft 137b of speed reducer 138. A sprocket 139 fixed to high speed shaft 137a is driven by an endless sprocket chain 140 over a power takeoff sprocket 141 which is driven, through a speed reducer 142 by means of a prime mover, such as an electrically driven motor 143 which drives sprocket 144 by the sprocket chain 145. As shown the speed reducing and driving mechanism is such as to rotate table 26 at an angular speed at from about one-twentieth to one-half revolution per minute.

The construction of the rotary furnace 18 is conventional. It is driven by conventional driving means 147, in turn driven by an electric motor.

The reducing furnace roof 33 is provided with a manhole and removable manhole cover 148 and a sight window 149 (FIG. 2).

In order to introduce the reducing gas into the reducing chamber 24 and to distribute it evenly and uniformly into the columnar charge of iron oxide passing downwardly through the reducing chamber, there is provided an annular tunnel 150 in the refractory brick lining 38 in furnace shell. The circular wall 151 dividing the tunnel space 150 and the interior of the chamber 24 is provided with a series of circumferentially spaced openings, or ports 152 (see FIGS. 3, 4, 5, 6). Thus the annular space 150 and ports 152 provide what may be called an annular manifold tunnel. Referring to FIGS. 5 and 6, it will be seen that a typical port 152 is made by bevelling off the corner of a brick in the row at the bottom of the tunnel as shown at 153, then the corners of adjacent brick lying in row 154 overlying the row 155, are bevelled to provide an inverted V-shaped port 152, the joints 156 being shown in FIGS. 5 and 6.

The discharge pipe 11 leading from the gas reformer 10 is preferably insulated either internally or externally. It is connected to the manifold tunnel 150 by a throat portion 11a extending through the refractory liner 38 and insulator outer liner 37 and secured in gas-tight relation by means of suitable flanges 159. An expansion joint 160 and a sampling well 161 is provided in the gas conduit 11. Now it will be seen that gas introduced through conduit 11 will pass into the circular tunnel 150 and thence through the distribution ports 152 into the charge of iron oxide granules which move downwardly through the chamber 24, it being understood also that the column of charge which rests upon rotating table 26 extends upwardly almost to the top of chamber 24. The gas flowing upwardly tends to cause the bed above the distribution manifold ports 152 to become slightly levitated and is maintained in a state of "free mobility" described later on. Its upper surface tends to appear to be boiling as a slowly boiling heavy liquid. As additional raw charge is introduced into the top of the reducing chamber 24 a corresponding amount of finished sponge iron product is carried away from the bottom of the charge resting on the table 26. This is brought about by means of the revolving table 26 and rotating delivery cylinder 27.

An illustrative operation of our iron oxide reducing apparatus will be described in connection with the production of sponge iron from granulated Ferramag, but it will be understood that the apparatus lends itself to operation for reduction of comminuted iron oxide for reduction of other metallic oxides to produce the metal in elemental form.

A typical Ferramag as introduced into the rotary furnace and then treated in the reducing furnace which had been produced from matte in a copper converter operation had the following composition (calculated from a quantitative chemical analysis):

| | Percent |
|---|---|
| $Fe_2O_3$ | 8.09 |
| $Fe_3O_4$ | 45.79 |
| $FeO$ | 30.42 |
| $Cu_2S$ | 4.12 |
| $Cu$ | 1.11 |
| $Fe_2SiO_4$ | 4.96 |
| $Ni_2SiO_4$ | 0.25 |
| $Zn_2SiO_4$ | 0.82 |
| Miscellaneous Silicates and Aluminates | 4.44 |

"Fayalite et al." 10.47%

The Ferramag was drawn off from the converter in the form of molten magma at a temperature near 2400° F. and was granulated by a water quenching operation to form a comminuted iron oxide charge material for treatment in the reducing furnace apparatus described above. Screen analysis for particle size of a typical granulated Ferramag is as follows:

*Screen Analysis*

| | (+¼″) | (−¼″+10) | (−10+30) | (−30+100) | (−100) |
|---|---|---|---|---|---|
| Percent [1] | 10.3 | 38.4 | 40.6 | 8.0 | 2.7 |

[1] Average of three runs.

It will be seen that a great preponderance of the charge is less than ¼″ and greater than 30 mesh in size. Any lumps substantially larger than ¼″ in dimension should be removed. If the material is too fine it becomes too difficult for reducing gas to pass through the charge and if there is too much of the coarser sizes the reduction of the larger particles becomes inefficient, because unreduced cores remain in the particles that are unduly large.

The granulated Ferramag was transported to the feed bin 16 from which it was passed in a regulated continuous stream of charge into the rotating furnace 18, the residual gases passing out through the stack 21. The water quenched and granulated Ferramag contains iron oxides in three forms: Hematite ($Fe_2O_3$), Magnetite ($Fe_3O_4$) and Ferra ($FeO$). These oxides of iron comprise about 85% to 90% of the total amount of Ferramag, the remainder of the components such as Fayalite ($Fe_2SiO_4$), $Cu_2S$, $Cu$ and minor amounts of other silicates making up the balance amounting to plus or minus (±) 10% to 15%. This ten to fifteen percent portion is referred to herein as "Fayalite et al."

The rotary furnace or kiln 18 is operated under conditions adjusted to condition the charge for efficient reduction to sponge iron in the reducing furnace 12. A combustible gas is burned in burner 20a with an excess of air. This causes the Magnetite ($Fe_3O_4$) and Ferra ($FeO$) in the charge to be oxidized substantially to Hematite ($Fe_2O_3$) so that the bulk of the uncombined oxides of iron in the feed material leaving the rotary kiln 18 and fed into the top end of reducing chamber 24 is Hematite ($Fe_2O_3$). Also the water quenched, granulated Ferramag is made up largely of particles which are under stress because of the rapid chilling of the molten particles in the quenching process. This material upon being introduced into the rotary kiln not only is completely dried, but a certain amount of decrepitation takes place and there is a certain amount of attrition due to particles rubbing against each other. This produces some fines. The thermal treatment in the rotary kiln is such that there is a consolidation of fines into larger particles, the result of which is to discharge from the rotary kiln not only a product in which the $Fe_3O_4$ and $FeO$ has been oxidized to $Fe_2O_3$ but the product contains less rather than more of the undesirable finer sized particles as a result of the thermal treatment in the rotary kiln. In order to accomplish this result, the rotary kiln 18 is operated by regulating the burner 20a to maintain a "high temperature zone" a few feet up stream or ahead of the rotary kiln discharge dam located at its discharge end 19. By controlling the operation of the burner 20a and burning combustible gas with excess air the high temperature zone is maintained at a temperature between about 2000° F. and about 2050° F. but preferably at about 2025° F. This temperature control may be aided by the use of a recording radiation pyrometer. The temperature of the charge leaving the rotary kiln 18 and entering the reduction chamber 24 is preferably maintained at about 2000° F. to 2050° F. This thermal treatment in the rotary kiln results not only in oxidation of $FeO$ and $Fe_3O_4$ in the granulated charge to $Fe_2O_3$ but there is also evolution of some heat because this reaction is exothermic. Furthermore the hot temperature causes the $Fe_2SiO_4$ in the granules which is considered to be a low melting point component to be softened sufficiently to bring about a consolidation of the fines present in the initial charge or produced by attrition in the rotary kiln. This consolidation (including also any reconsolidation) of fines is attributed to the joint effects of (1) kiln heat augmented by the reaction heat and of (2) the cementing action of the "Fayalite et al." This should not be confused with sintering or roasting as these terms are ordinarily used in the art and described in metallurgical treatises. It is more in the nature of a cementing action brought about by the softening of the Fayalite which results in a consolidation of fines.

It will be observed that the rotary kiln, as modified and operated by us, serves multiple functions. It serves as a dryer and conveyor, a partial desulfidizer, an oxidizer and eliminator of zinc, if present in the charge. It also serves as an oxidizer of the lower oxides of iron $FeO$ and $Fe_3O_4$ to $Fe_2O_3$, a consolidator (or agglomerator or pelletizer) of the fines so that the charge will have free mobility and a pre-heater of the charge to bring it up to optimum temperature for introduction into the reducing column 24 and at a temperature most favorable for the gaseous reduction of the now oxidized iron oxide to convert the charge to sponge iron form.

Further consolidation of the particles is not encountered in the reducing column because the environment is reducing instead of oxidizing. Reduction of the oxides of iron is endothermic rather than exothermic and the softening or flowing point of the cementing eutectic is not attained to any extent (if at all) within the charge. Inasmuch as the fines are consolidated in the rotary furnace 18, the material charged to the reduction chamber 24 has free mobility which permits of unblocked flow of the reducing gases upwardly through the charge in the chamber 24, whereas an undue amount of fines in the charge tends to block the proper flow of gases through the charge.

The charge from the rotary kiln 18 is then passed through the reducing chamber 24, it being understood that in normal operation this chamber is filled with the comminuted iron oxide charge up to dotted line 99, within approximately 12 to 18 inches from its roof. Meantime reducing gas, as described in further detail hereinafter, was continuously passed upwardly through the column of charge in the reducing chamber 24.

The reducing gas was produced by incomplete oxidation of natural gas with air in a reformer (shown more or less diagrammatically) ts indicated in the drawings by reference numeral 10. The reformed gas, which is discharged from the reformer at a high temperature was passed into the reduction furnace through port 11a into the annular distributor or manifold tunnel 150 at a temperature of approximately 1765° F. The reducing gas passed through the distributor ports 152 in the columnar bed of charge in the reducing chamber 24, upwardly in intimate contact with the downwardly moving charge which, as mentioned, rests upon the rotating bottom closure 26. It will be understood, of course, that the reducing reaction in the reducing chamber is endothermic and it is desirable to keep the temperature of the charge in the reducing chamber above 1450° F. but lower than 1800° F., and in any event, not so high that agglomeration or consolidation will occur by fusion of the particles. Feed rates of the charge, and of the reducing gas, and its temperature are adjusted to meet these desirable conditions. The temperature of the spent gas leaving the reducing chamber was 1450° F.

It is important in the operation of the reducing furnace to maintain the charge in a state which is referred to herein as 'free mobility.' This should not be confused with the process called "fluidization" which refers to a method of operation in which the solid particles are maintained in a state of suspension and the solids behave according to hydraulic laws, flowing like and resembling a liquid and in a concurrent direction with the gases. In contrast, "free mobility" may be defined as a subdued state of continuous activity or unrest resembling mild boiling of the charge particles, the overall effect of which is a movement of the charge downward or countercurrent to the upward gas flow whereby the charge is in a state of buoyancy and the tendency of the newly reduced particles, whether reduced superficially or completely, to adhere to each other and form undesired lumps, is inhibited. With "free mobility" the continuous and uniform operation of the reucing column 24 is made possible; it being important, however, to break up promptly any incrustation, if any should form, and to move material outwardly into the buoyant charge, in the event a quiescent central core of newly deposited feed should form.

Typical analyses of the reformed natural gas used as reducing agent introduced into the charge to bring about the reducing reaction and of the spent gas leaving the charge in the reducing chamber after the reducing reaction are as follows:

|  | Reformed Natural Gas (Reducing Gas before Reducing Operation), Percent | Spent Gas (After Reducing Reaction), Percent |
|---|---|---|
| $H_2$ | 32.8 | 21.4 |
| $CO$ | 18.0 | 12.0 |
| $H_2O$ | 2.7 | 13.8 |
| $CO_2$ | 0.9 | 7.0 |
| $CH_4$ | 0.6 | 0.6 |
| $N_2$ | 45.0 | 45.2 |

The charge was introduced into the reducing chamber 24 in a continuous stream at the rate of 640 pounds per hour and finished granular sponge iron product was removed from the bottom of the columnar bed of charge at a corresponding rate (500 pounds per hour) so as to maintain a substantially constant level of charge of iron oxide material in the reducing chamber. The reducing gas at a temperature of 1750° F. was introduced at a rate of 374 cu. ft. per minute (corrected to standard conditions, 60° F., 14.7 p.s.i.a.).

The table 26 was rotated on tis vertical axis 90 at the rate ½ to 1/20 revolution per minute and was cooled by circulating cooling water through its cooling jacket. The rotation of the bottom closure or table 26, accompanied by the "nibbling action" of the rotating delivery cylinder helps to maintain the particles in the columnar charge in continuous movement. The column of charge above the gas distributor ports 152 is kept in a state of levitation and free mobility by the upward flow of reducing gases. As the charge moves downwardly there is a tendency of the particles to move slowly in a circular direction due to rotation of the table on which the column of charge rests. The iron oxide is reduced to metallic iron in the form of sponge iron and the finished product is removed from the bottom of the column by the delivery cylinder 27.

When the delivery cylinder sprocket rides around in its orbit on the chain track 82, the delivery cylinder 27 rotates on its axis 86 and as the coaxial grooves 112 are brought successively under and in contact with the bed of material, the grooves are filled with finished product which is delivered into the chute 87 and discharged into the circular receiving channel 94 around its whole path since the chute rotates with the table. The channel 94 is cooled by circulating cooling water and this helps to cool the finished hot sponge iron product delivered into this receiving channel.

The hoes 105, which rotate with the table push the product lying before it in the channel 94 into the stationary delivery chute 29, through which it passes into the receiver 30 where it may be temporarily stored for subsequent use, but out of contact with atmospheric air.

A chemical analysis of the charge and of the sponge iron product produced from it, follows:

|  | Ferramag Before Reduction, Percent | Sponge Iron After Reduction, Percent |
|---|---|---|
| $Fe_T$ | 65.35 | 84.75 |
| $Fe_m$ | 00.0 | 81.22 |
| $Fe_3O_4$ | 45.79 |  |
| $Cu$ | 4.40 |  |
| $SiO_2$ | 4.64 |  |
| $S$ | 0.83 | 0.13 |
| $Zn$ | 0.48 | 0.3 |
| $Ni$ | 0.14 |  |

$Fe_T$ means total iron.
$Fe_m$ means iron in elemental form.

The percentage of reduction of the total iron exceeded 95%. There is a decrease when the tonnage of charge introduced is compared with tonnage of finished product delivered from the reducing chamber. This is, of course, accounted for primarily by loss of oxygen.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a reduction apparatus for the treatment of a comminuted charge containing metallic oxides to be reduced, a reduction chamber through which the charge is passed for reducing reaction having an upper end for the introduction of charge to be treated therein and a lower end from which to deliver treated charge, conduit means connected to said chamber for introducing a gaseous reducing agent into a charge in said chamber, a rotatable bottom closure having a circular periphery and closing said lower end of said chamber and upon which treated charge temporarily rests as it passes through said chamber, means mounting said bottom closure for rotation on a vertical axis, a rotatable delivery cylinder having cutter means at its periphery, means mounting said delivery cylinder on said bottom closure for rotation of its periphery in contact with the treated charge resting upon said bottom closure and with the axis of rotation of said cylinder extending from the periphery of said rotatable bottom closure toward its vertical axis, drive means connected with said bottom closure and drive means connected with said rotatable delivery cylinder operative to rotate said delivery cylinder on its axis of rotation simultaneously with the rotation of said bottom closure on its vertical axis, said cutter means removing small amounts from said treated charge upon rotation of said cylinder and bottom closure and delivering said amounts to a place outside of said chamber.

2. Apparatus for producing sponge iron or the like from a comminuted oxide charge which comprises an insulated refractory lined reducing chamber having a top and bottom end, means for introducing charge into the upper end portion of said chamber, a rotatable bottom closure member mounted for rotation at the bottom end of said chamber, said closure member having a top surface upon which a column of said charge rests, means for introducing a reducing gas into said charge at the lower end portion of said column, a radially disposed slot in said closure member, cutter means including a rotatable cylinder mounted in said slot for rotation under the bottom of said column of charge operative in conjunction with the rotation of said bottom closure to remove increments of finished product from the bottom end of said column for delivery to a receiver outside of said chamber.

3. Apparatus for producing sponge iron from a comminuted iron oxide charge which comprises a reducing chamber having a top and bottom end through which the charge passes and in which the iron oxide is reduced to sponge iron during its passage downwardly through said chamber, means for introducing the comminuted iron oxide charge into the upper end of said chamber, a bottom closure in the form of a circular rotatable table closing the bottom end of said chamber upon which the charge introduced into said chamber temporarily rests during its passage through said reducing chamber, means mounting said table for rotation about a vertical axis, means operative to rotate said table about said vertical axis, a rotatable delivery cylinder, means mounting said delivery cylinder on said table for rotation about an axis disposed at right angles to said vertical axis, said cylinder having means defining delivery pockets in which to collect finished sponge iron product in said chamber when it reaches said table and to deliver it to outside of said chamber upon rotation of said cylinder said cylinder being mounted below the surface of said table with the periphery of said cylinder in contact with the bottom end of the column of charge resting on said table, means operative in response to rotation of said closure table to rotate said delivery cylinder and collector and conduit means for receiving the sponge iron product delivered from said chamber by said delivery cylinder, said collector and conduit means being sufficiently sealed from the ambient atmosphere to prevent substantial oxidation of said iron oxide product by ambient atmospheric air after it is removed from said reducing chamber.

4. Apparatus for producing sponge iron from a comminuted iron oxide charge which comprises a reducing chamber having a top end and a bottom end and through which said charge passes for treatment, means for introducing the comminuted iron oxide charge into the upper end of said chamber to form a column of charge in said chamber, a bottom closure in the form of a rotatable table closing the bottom end of said chamber upon which said column of charge rests temporarily as it passes through said chamber, conduit means connected with said chamber at its lower end for introducing a gaseous reducing agent into said charge in said chamber simultaneously with the downward movement of said charge, means mounting said table for rotation about a vertical axis, means operative to rotate said table about said vertical axis, a rotatable delivery cylinder, means mounting said delivery cylinder on said table for rotation about a horizontal axis radially disposed on said table at right angles to said vertical axis, said cylinder having means defining delivery pockets in which to collect finished product from the bottom end of the column of treated charge resting on said table in the bottom end of said chamber and to deliver the collected treated charge to outside of said chamber upon rotation of said cylinder, means operative in response to rotation of said table on said vertical axis to rotate said delivery cylinder on its horizontal axis causing said delivery cylinder to nibble increments of treated charge from the bottom of said column, collector conduit means mounted below said table into which said nibbled increments of treated charge are delivered by said cylinder.

5. Apparatus for producing sponge iron from a comminuted iron oxide charge which comprises a reducing chamber having a top end and a bottom end, means for introducing the comminuted iron oxide charge into the upper end of said chamber, a bottom closure in the form of a circular rotatable table having a table top closing the bottom end of said chamber, a water jacket beneath said table top, means for circulating cooling water through said jacket, means mounting said table for rotation about a vertical axis, means including a prime mover operative to rotate said table about said vertical axis, means defining a radially disposed slot in said table a horizontally disposed rotatable delivery cylinder, means mounting said delivery cylinder in said slot on said table for rotation about an axis positioned below the surface of said table top and disposed at right angles to said vertical axis and with the uppermost peripheral surface of said cylinder no more than a short distance above the surface of said rotatable table, said cylinder having means defining delivery pockets in which to collect finished product treated in said chamber and to deliver it to outside of said chamber upon rotation of said cylinder, and means operative in response to rotation of said closure table to rotate said delivery cylinder.

6. Apparatus for producing sponge iron from a comminuted iron oxide charge which comprises a vertically disposed refractory lined reducing chamber, means for preheating and introducing the comminuted iron oxide charge into the upper end of said chamber, conduit means including an annular tunnel surrounding said chamber having circumferentially spaced ports therein, for introducing reducing gas into a charge of iron oxide in said chamber, a circular bottom closure in the form of a rotatable table having a horizontally disposed table top closing the bottom end of said chamber upon which said charge temporarily rests, a water jacket beneath said table top, water circulating means for passing cooling water through said jacket, means mounting said table for rotation about a vertical axis, means including a prime mover operative to rotate said table about said vertical axis, means defining a radially disposed slot in said rotatable table, a horizontally disposed rotatable delivery cylinder, means mounting said delivery cylinder on said table for rotation about a horizontal axis disposed below the upper surface of said table top at right angles to said vertical axis and radially disposed in said slot, said cylinder having coaxially disposed grooves at the peripheral surface of said cylinder in which to collect finished product in said chamber and to deliver said finished product to outside of said chamber upon rotation of said cylinder, and means operative in response to rotation of said closure table to rotate said delivery cylinder, said cylinder removing finished product from the bottom of the charge on said table by nibbling increments of product therefrom as said cylinder is rotated.

7. Apparatus for producing sponge iron from a comminuted iron oxide charge which comprises a vertically disposed refractory lined reducing chamber of circular cross section and increasing in diameter from its top end to its bottom end, means for preheating and introducing the comminuted iron oxide charge into the upper end of said chamber, conduit means including a tunnel surrounding said chamber at its lower end and having ports through which to introduce reducing gas into a charge of iron oxide in said chamber, a bottom closure in the form of a rotatable table having a table top closing the bottom end of said chamber and on which said charge temporarily rests, a water jacket beneath said table top, water circulating means for passing cooling water through said jacket, means mounting said table for rotation about a vertical axis, means including a prime mover operative to rotate said table about said vertical axis, a radially disposed slot in said rotatable table, a horizontally disposed rotatable delivery cylinder, means mounting said delivery cylinder on said table for rotation about an axis disposed at right angles to said vertical axis, said cylinder being radially disposed in said slot with its axis of rotation positioned below the upper surface of said table top, said cylinder having coaxially disposed grooves at the peripheral surface of said cylinder in which to collect finished product in said chamber and to deliver said finished product to the hereinafter mentioned delivery chute outside of said chamber upon rotation of said cylinder, and means operative in response to rotation of said closure table to rotate said delivery cylinder, means defining a delivery chute communicating with said slot and rotatable with said table in a circular path, a receiving trough mounted below said delivery chute and having a discharge chute, and shovel means to move finished product in said trough to said discharge chute, said delivery cylinder, upon rotation on its horizontal axis simultaneously with the rotation of said table on its vertical axis, nibbling increments of charge from the bottom of said charge resting on said table and delivering said increments into said delivery chute.

8. Apparatus according to claim 7 in which the means for rotating the delivery cylinder in response to rotation of said table comprises a sprocket chain fixedly mounted in a circular path disposed in a horizontal plane and a sprocket wheel fixedly mounted on the outer end of said delivery cylinder, the teeth of which engage said chain, said sprocket wheel passing in a circular orbital path about the vertical axis of said table while said sprocket wheel simultaneously rotates on its horizontal axis.

9. Apparatus according to claim 8 in which said means for preheating the comminuted oxide charge comprises a rotary furnace, means to rotate said rotary furnace and means for introducing hot combustion gases into the discharge end of said furnace.

References Cited in the file of this patent

UNITED STATES PATENTS

| | | |
|---|---|---|
| 515,085 | Iles | Feb. 20, 1894 |
| 1,932,388 | Weaton | Oct. 31, 1933 |
| 1,979,729 | Brown | Nov. 6, 1934 |
| 2,330,487 | Grace | Sept. 28, 1943 |
| 2,345,067 | Osann | Mar. 28, 1944 |
| 2,417,949 | Riveroll | Mar. 25, 1947 |
| 2,506,618 | Sainderichin | May 9, 1950 |
| 2,688,046 | Norton et al. | Aug. 31, 1954 |
| 2,969,156 | Miller et al. | Jan. 24, 1961 |
| 2,993,779 | Basen et al. | July 25, 1961 |